United States Patent [19]

Muramatsu et al.

[11] Patent Number: 5,842,139
[45] Date of Patent: Nov. 24, 1998

[54] TELEPHONE COMMUNICATION TERMINAL AND COMMUNICATION METHOD

[75] Inventors: Ryujiro Muramatsu, Yokohama; Toshiro Suzuki, Tama, both of Japan

[73] Assignee: Hitachi, Ltd., Tokyo, Japan

[21] Appl. No.: 498,126

[22] Filed: Jul. 5, 1995

[30] Foreign Application Priority Data

Jul. 8, 1994 [JP] Japan .................................. 6-157248

[51] Int. Cl.6 ................................ H04Q 7/20; H04Q 7/32
[52] U.S. Cl. ........................ 455/563; 455/404; 455/567; 381/110
[58] Field of Search ................................ 381/41, 42, 56, 381/110; 379/58–61; 455/404, 425, 563, 564, 567, 569, 570

[56] References Cited

U.S. PATENT DOCUMENTS

| | | | |
|---|---|---|---|
| 4,332,981 | 6/1982 | Palombi et al. | 379/61 |
| 4,864,622 | 9/1989 | Iida et al. | 381/42 |
| 5,165,095 | 11/1992 | Borcherding | 381/42 |
| 5,295,190 | 3/1994 | Yamashita et al. | 381/41 |
| 5,581,595 | 12/1996 | Iwashita et al. | 379/58 |

OTHER PUBLICATIONS

G.J. Vysotsky, "VoiceDialing—The First Speech Recognition Based Telephone Service Delivered to Customer's Home", IVTTA 94, Sep. 26, 1994, pp. 149–152.

*Primary Examiner*—Curtis Kuntz
*Assistant Examiner*—Binh K. Tieu
*Attorney, Agent, or Firm*—Fay, Sharpe, Beall, Fagan, Minnich & McKee

[57] ABSTRACT

A telephone communication terminal responsive to a voice for originating a call includes an antenna, a diplexer, a radio unit, a base band unit, a controller, a loudspeaker, a microphone, a key input and display unit, a sound level measuring instrument, threshold generators, comparators, an analyzer, and a destination number storage. The sound level measuring instrument always measures the sound level of an input signal, such as a voice inputted from the microphone. The sound level measuring instrument conducts processing such as calculating signal power at fixed intervals. The output of the sound level measuring instrument is compared in a first comparator with the output of a first threshold generator outputting a preset threshold value. In the case where the output of the sound level measuring instrument is greater than the threshold value, a result of comparison is conveyed to the controller. The analyzer effects an analysis on an input signal and outputs information. The output of the analyzer is compared in a second comparator with lower and upper limit threshold values outputted from a second threshold generator.

14 Claims, 6 Drawing Sheets

TELEPHONE COMMUNICATION TERMINAL AND COMMUNICATION METHOD

BACKGROUND OF THE INVENTION

The present invention relates to telephone communication terminals, and in particular to telephone communication terminals which effect not only a manually-operated calling function but also an automatic calling function using a voice or the like, and which are suitable for use by infants and sick persons.

Telephone communication terminals include wire terminals and radio terminals. Telephone communication terminals according to the present invention can be applied to telephone communication terminals of both types. Especially as to communication terminals of a mobile telephone such as a cordless telephone and a cellular telephone for which the present invention brings about a great effect, a conventional technique will now be described.

Figure 1:
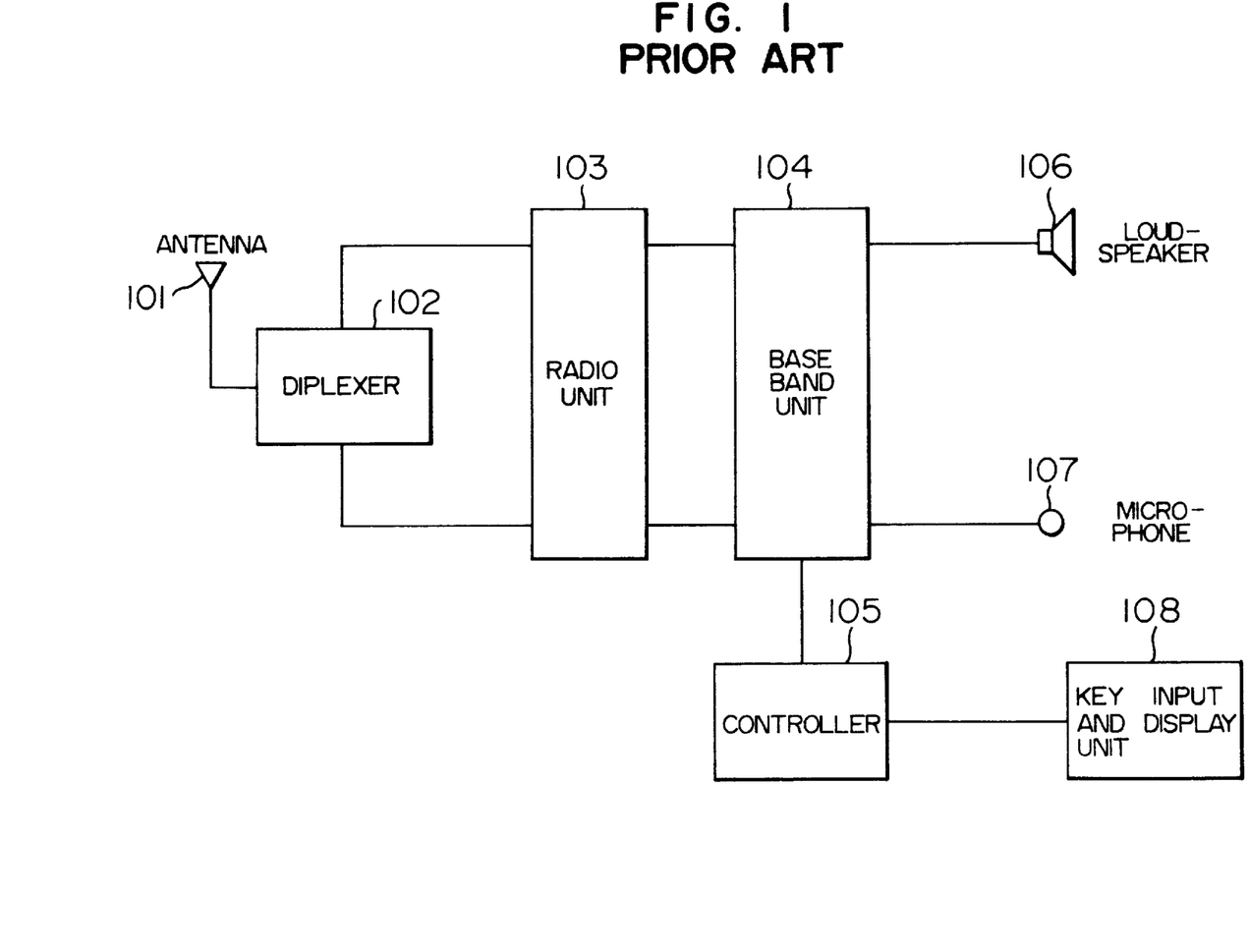
FIG. 1 is a configuration diagram of a mobile communication terminal according to a conventional technique.

FIG. 1 shows the configuration of a mobile telephone communication terminal.

A mobile telephone telecommunication terminal has, on the surface thereof, an antenna 101, a loudspeaker 106 functioning as a telephone receiver, a microphone 107 functioning as a telephone transmitter, and a key input and display unit 108 used for calling and other purposes. The mobile telephone terminal has therein a diplexer 102, a radio unit 103, a base band unit 104, and a controller 105.

Operation of the process beginning from origination of a call to a mobile telephone communication terminal and lasting until commencement of speech will now be described.

The caller depresses an off-hook key on the key and input display unit 108. Off-hook information is conveyed from the controller 105 to the antenna 101 via the baseband unit 104, the radio unit 103 and the diplexer 102. Then the off-hook information is transmitted from the antenna 101 to an exchange via a radio channel. A dial tone is inputted from the exchange to the antenna 101 via a radio channel. The dial tone is then conveyed through the diplexer 102, the radio unit 103 and the base band unit 104, and outputted from the loudspeaker 106. Then the caller inputs the telephone number of the destination via the key input and display unit 108. The telephone number information is converted to dial pulses or push-button (touch tone) signals by the controller. The dial pulses or push-button signals are conveyed through the base band unit 104, the radio unit 103 and the diplexer 102, and then transmitted from the antenna 101 to the exchange via a radio channel.

The destination number is analyzed in the exchange, and the destination telephone terminal is called. During the ringing interval, a ring back tone is transmitted from the exchange to the caller and outputted from the loudspeaker 106. If the called party is busy, a busy tone is transmitted instead of the ring back tone and outputted from the loudspeaker 106. If the called party answers the call, the exchange stops the ring back tone and establishes a communication path. As a result, the caller can speak with the called party.

For calling in the conventional telephone communication systems, it is necessary for the caller to input the destination number via keys by manual operation. In some cases, it becomes difficult for some infants and sick persons to originate a call manually. The conventional system has a problem that an object of communication cannot be achieved especially in the case where emergency communication is required as in the case of an injury or a sudden change of the condition of a disease.

As a conventional automatic calling system using voice inputs, there is a voice dialing system using a speech recognition technique. Since complicated processing such as DP (dynamic programming) matching or HMM (hidden Markov model) processing is required, however, the voice dialing system has a problem that the apparatus becomes expensive.

SUMMARY OF THE INVENTION

In view of the above described problems, the present invention has been made. An object of the present invention is to provide a telephone communication terminal which allows call origination without involving a manual operation, and which realizes communication with a desired party by using a relatively simple method and with a low cost.

In order to solve the above described problems, a telephone communication terminal according to the present invention includes (1) means for monitoring the sound level and spectral shape or spectral distribution of the voice or the like inputted to the telephone transmitter of the terminal and responsive to detection of a sound level having a certain value or above and spectral information lying in a certain range, for automatically originating a call toward a first telephone number registered beforehand, (2) means for automatically originating a call toward a second telephone number registered beforehand in the case where the automatically called party having the first telephone number is busy or does not answer the call, and (3) hands-free phone means for outputting, through a loudspeaker, the voice received at the terminal.

The telephone communication terminal according to the present invention can respond to a cry of an infant existing near the terminal, a voice generated by a sick person, and a loud sound to automatically originate a call to a desired person.

Voices of the calling person are outputted to the vicinity of the calling terminal via a loudspeaker. Even if the person who caused calling is not adjacent to the calling terminal, therefore, speaking can be effected.

Since the calling terminal in the present invention is not limited to mobile communication terminals, the present invention can be applied to wire terminals as well.

DESCRIPTION OF THE PREFERRED EMBODIMENTS

Figure 2:
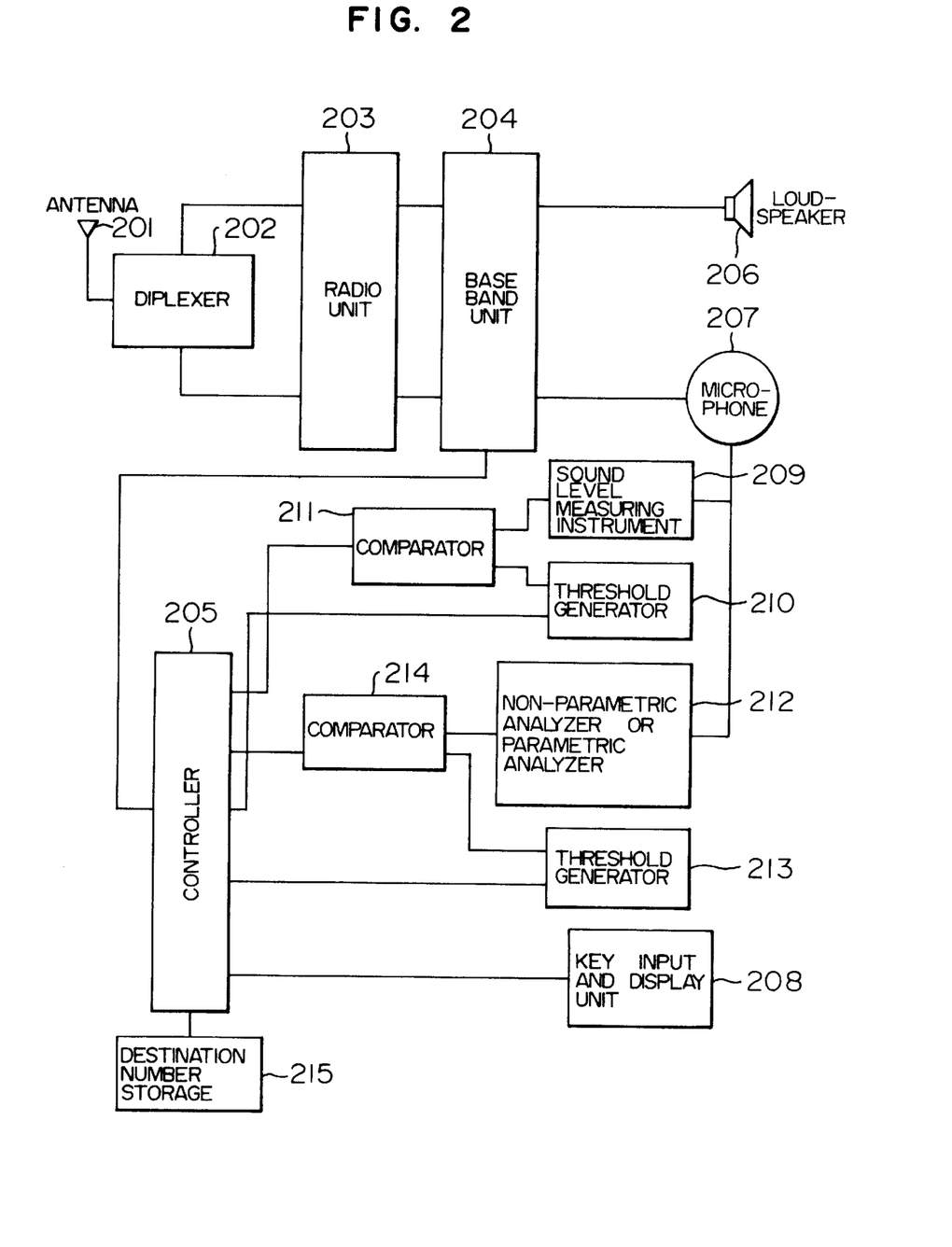
FIG. 2 is a configuration diagram of a terminal showing a first embodiment of the present invention.
Figure 3:
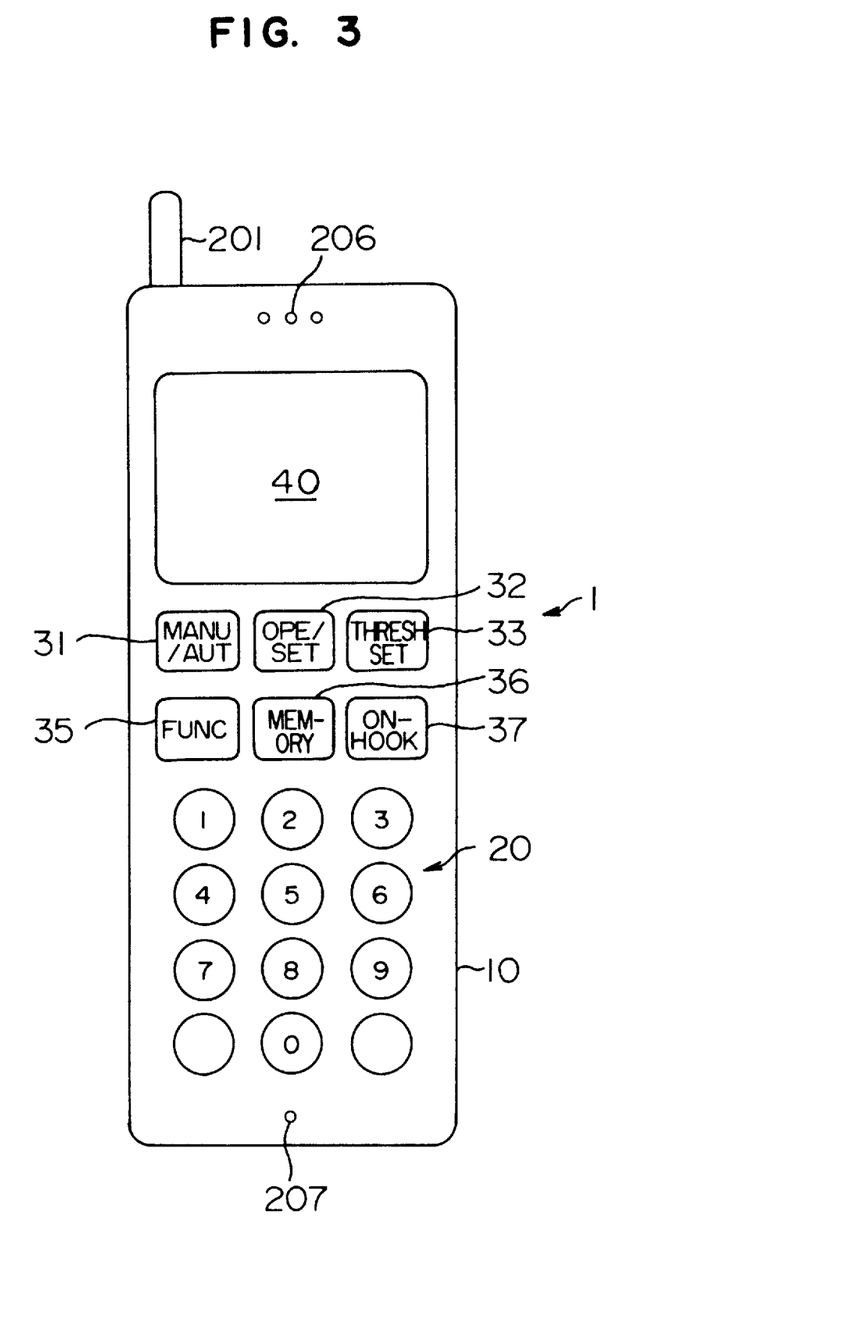
FIG. 3 is an exterior view of a terminal showing the first embodiment of the present invention.

FIG. 2 shows the configuration of a first embodiment of a telephone communication terminal according to the present invention. FIG. 3 shows an exterior view thereof.

With reference to FIGS. 2 and 3, a telephone communication terminal 1 has a loudspeaker 206, a microphone 207 and an antenna 201 on a main body 10 thereof. The telephone communication terminal 1 has a ten-key group 20, a manual/automatic key 31, an operation/setting key 32, a threshold setting key 33, a function key 35, a memory key 36, and an on-hook key 37 as input means of a key input and display unit 208. The telephone communication terminal 1 has a display 40 as output means of the key input and display unit 208.

The telephone telecommunication terminal is formed by the antenna 201, a diplexer 202, a radio unit 203, a base band unit 204, a controller 205, the loudspeaker 206, the microphone 207, the key input and display unit 208, a sound level measuring instrument 209, threshold generators 210 and 213, comparators 211 and 214, an analyzer 212, and a destination number storage 215. Components 201 through 208 correspond to components 101 through 108 shown in FIG. 7, respectively. The telephone communication terminal of the present invention differs from the conventional telephone communication terminal in that the telephone communication terminal of the present invention has the sound level measuring instrument 209, the threshold generator 210, the comparator 211, the analyzer 212, the threshold generator 213, the comparator 214, and the destination number storage 215.

Figure 4:
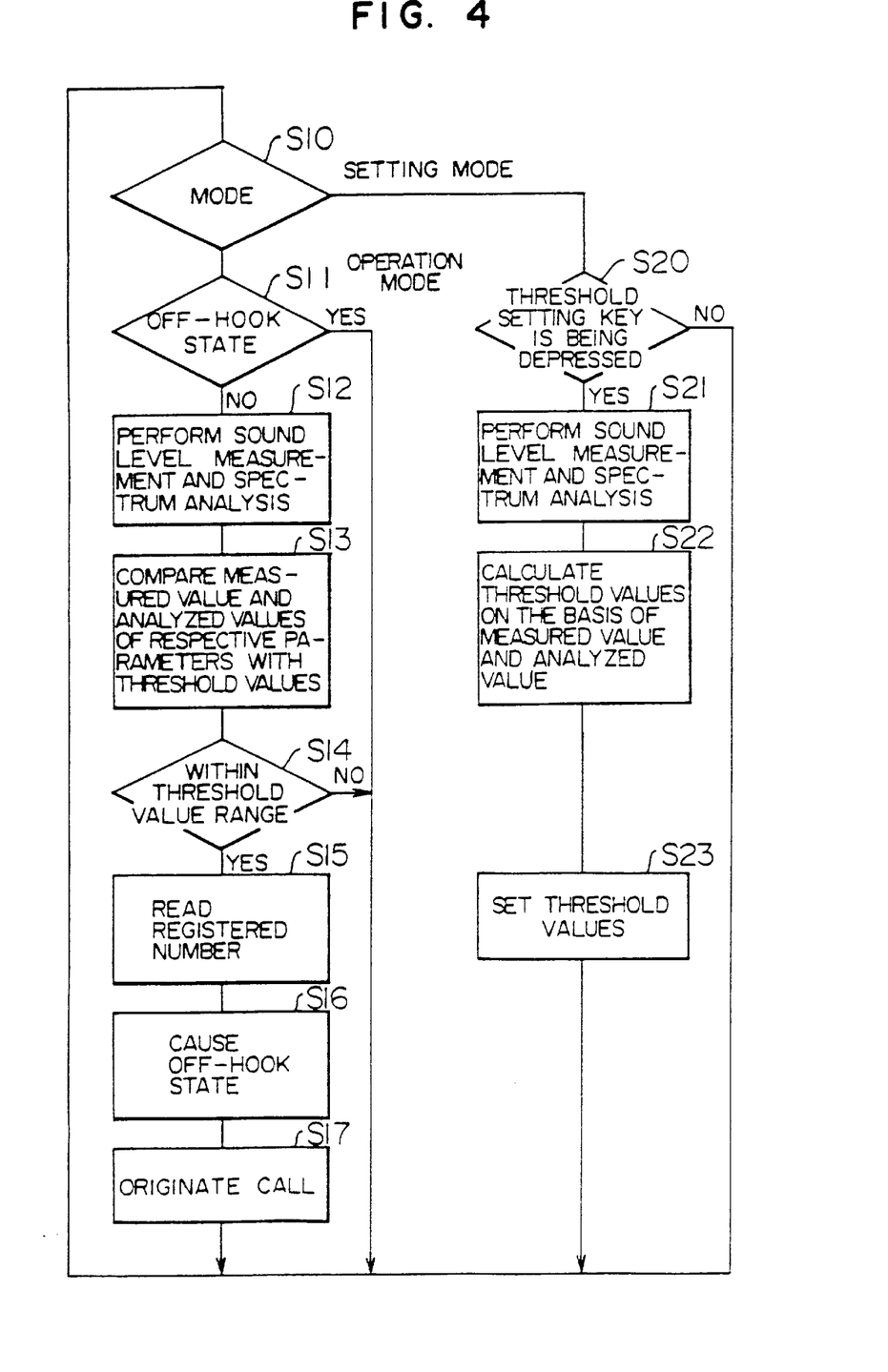
FIG. 4 is a processing flow in the first embodiment of the present invention.

FIG. 4 shows the flow of processing at the time of an operation mode and the flow of processing at the time of a setting mode.

Hereafter, the operation of the present embodiment will be described by referring to FIGS. 1 through 3.

After power is turned on, switchover from the manual calling mode to the automatic calling mode is effected by using the manual/automatic key 31 shown in FIG. 3. Either the operation mode or the setting mode is set by using the operation/setting key 32 shown in FIG. 3 (step S10).

In the off-hook state (step S11) in the case of the operation mode, the controller 205 makes the sound level measuring instrument 209, the threshold generators 210 and 213, the comparators 211 and 214, and the analyzer 212 start operation hereafter described.

The sound level measuring instrument 209 always measures the sound level of an input signal such as a voice inputted from the microphone 207 (step S12). The sound level measuring instrument 209 conducts processing such as calculating signal power every fixed interval, for example. The output of the sound level measuring instrument 209 is compared in the comparator 211 with the output of the threshold generator 210 outputting a preset threshold value. If the output of the sound level measuring instrument 209 is greater than the threshold value, the result of comparison is conveyed to the controller 205 (step S13).

The analyzer 212 effects a non-parametric analysis or a parametric analysis of the input signal and outputs short time spectral information or spectral envelope information. In the parametric analysis, modeling is effected for a voice signal or the like and feature parameters representing that model are extracted. As for the parametric analysis, there is a method of conducting spectral processing on a voice signal by using linear predictive coding. In the non-parametric analysis, such modeling depending upon the signal property is not effected. The non-parametric analysis can accommodate various signals in common. As for the non-parametric analysis, there is a short time spectrum analysis, for example.

The threshold generator outputs preset threshold values. The output of the analyzer 212 is compared in the comparator 214 with a lower limit threshold value and an upper limit threshold value outputted from the threshold generator 213 parameter by parameter. If every parameter outputted from the analyzer 212 is within a range between the lower limit value and the upper limit value outputted parameter by parameter from the threshold generator 213 (step S14), the result of comparison is conveyed to the controller 205.

Upon receiving both outputs, the controller 205 judges that an input signal satisfying the conditions preset by the threshold values has arrived. The controller 205 reads out a telephone number registered beforehand in the destination number storage 215 (step S15), and thereafter causes an off-hook state (step S16). The controller 205 sends out number information from the antenna 201 via the base band unit 204, the radio unit 203 and the diplexer 202 (step S17).

By thus configuring the analyzer 212 and effecting control on the basis of outputs of both the sound volume measuring instrument 209 and the analyzer 212, false operations can be maximally suppressed.

Upon receiving this number information, the exchange analyzes the destination number and calls the destination telephone terminal. During the ringing interval, a ring back tone is sent from the exchange to the caller and outputted to the loudspeaker 206. If the called party is busy, the busy tone is sent instead of the ring back tone and outputted to the loudspeaker 206. If the called party answers, a speaking state is brought about.

As for the threshold values of the threshold generators 210 and 213, the user can freely set them via the key input and display unit 208 under the control of the controller 205 according to the use. The threshold values are set by switching over to the setting mode via key inputting.

By referring to a processing flow in the setting mode shown in FIG. 4, the method of setting the threshold values will now be described. After switchover to the setting mode is effected by using the key 32, the telephone communication terminal is placed in such an environment that a call is automatically originated by a voice input. When a voice to be sensed is uttered, the threshold setting key 33 shown in FIG. 3 is depressed (step S20). Thereby processing of sound volume and spectrum analysis is executed on this voice input (step S21). On the basis of the measured value and analyzed value, threshold values are calculated (step S22).

The threshold values are determined as follows, for example. A value obtained by subtracting a fixed value $\alpha$ from the average value of measured sound volume is determined to be a sound volume threshold value. A value obtained by adding a fixed value $\beta$ to the average value of each of analysis parameters is determined to be an upper limit threshold value. A value obtained by subtracting a fixed value $\beta$ from the average value of each of the analysis parameters is determined to be a lower limit threshold value. After the threshold values have been determined, they are set in the threshold generators 210 and 213, respectively (step S23).

By thus setting, automatic calling can be effected without fail or false operation.

In the present embodiment, a call is originated accurately by a preset voice signal such as a cry of an infant, a voice generated by a sick person, or a loud sound, and communication to the registered destination can be performed.

In the present embodiment, however, the original object is not achieved in the case where the called party is absent or busy. A method capable of coping with such a case will hereafter be described.

Figure 5:
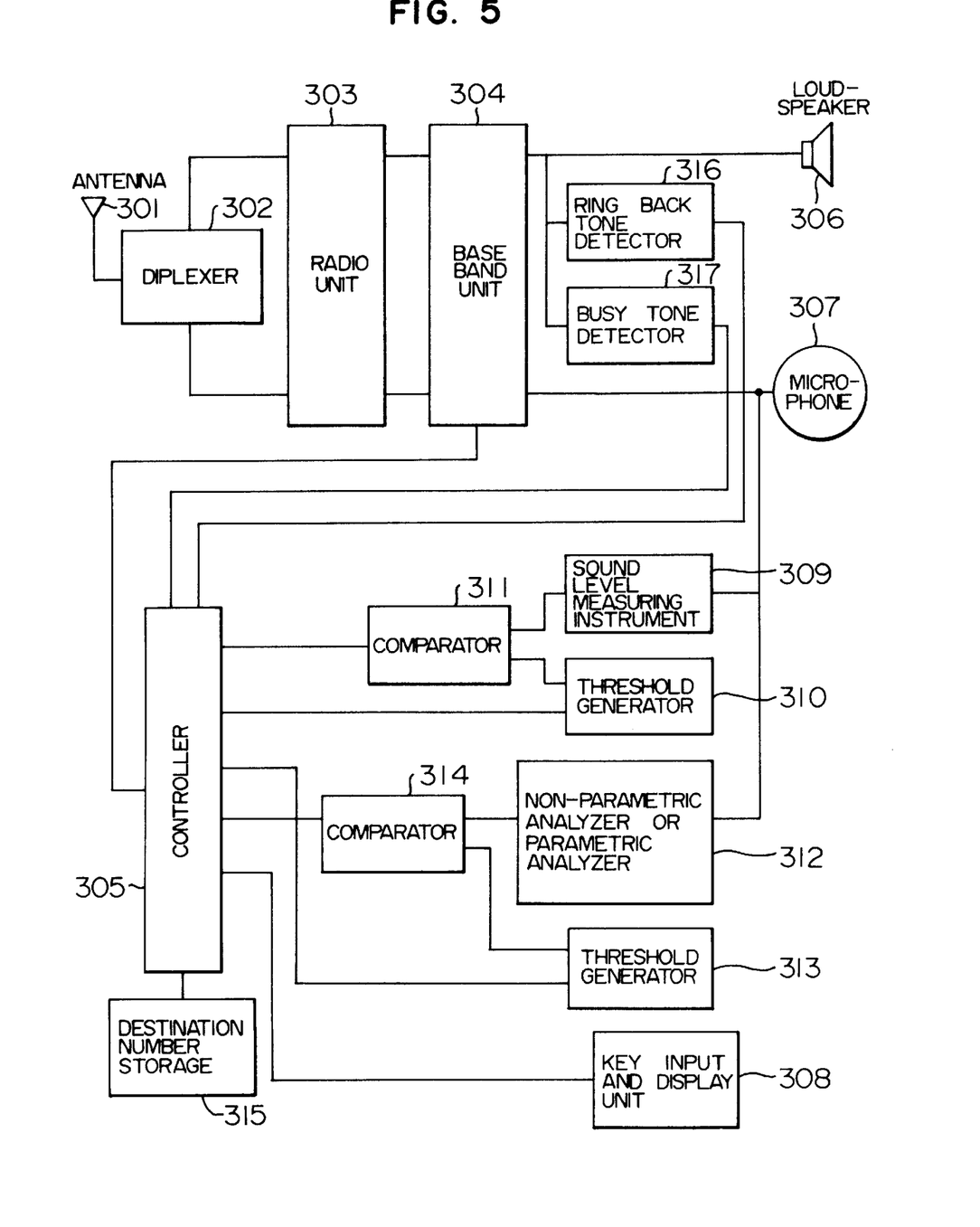
FIG. 5 is a configuration diagram of a terminal showing a second embodiment of the present invention.

The configuration of a second embodiment of a telephone communication terminal according to the present invention is shown in FIG. 5. The present embodiment differs significantly from the first embodiment in that the case where the called party is absent or busy can be coped with owing to the provision of a ring back tone detector 316 and a busy tone detector 317.

In addition to the configuration of the first embodiment, the telephone communication terminal has the ring back tone detector 316 and the busy tone detector 317. In parallel with a loudspeaker 306, the ring back tone detector 316 and the busy tone detector 317 are connected to a base band unit 304. Outputs of the ring back tone detector 316 and the busy tone detector 317 are connected to a controller 305. The ring back tone detector 316 monitors the ring back tone to determine whether it is continuously heard for at least a predetermined time period since it begins to be heard. If the duration exceeds the predetermined time period, the ring back tone detector 316 informs the controller 305 of that fact. The busy tone detector 317 monitors the busy tone to determine whether it is continuously sensed for at least a predetermined time period since it has begun to be sensed. If the duration exceeds the predetermined time period, the busy tone detector 317 informs the controller 305 of that fact.

Components 301 through 315 correspond to the components 201 through 215 in the first embodiment, respectively. The components 301 through 315 function in the same way as the first embodiment and will not be described.

Hereafter, operation of the present embodiment will be described by referring to FIG. 5.

The operation conducted until a destination terminal is called by origination of a call is similar to that in the first embodiment. If the called party does not answer, the ring back tone is sent from the exchange to the calling terminal and outputted from a loudspeaker 306. If the called party is busy, the busy tone is sent from the exchange to the calling terminal and outputted from the loudspeaker 306.

If the ring back tone or the busy tone continues for at least a predetermined time period since start of the ring back tone or the busy tone, the controller 305 automatically causes the on-hook state and disconnects the call assuming the off-hook state on the basis of outputs of the ring back tone detector 316 and the busy tone detector 317. Thereafter, the controller reads out a second telephone number registered beforehand in a destination number storage 315 and outputs number information from an antenna 301 via the base band unit 304, a radio unit 303 and a diplexer 302.

By this operation, the destination terminal having the second telephone number is called. If the called party answers, the calling party can speak with the called party.

In the second embodiment, a call to a first destination is automatically originated by a voice or the like. Even if the called party of the first destination is absent or busy, a call to a second destination is automatically originated to perform communication. While the present embodiment is configured so as to originate a call to the second destination when speaking is difficult due to absence of the called party of the first destination, the terminal may be configured so as to automatically originate a call to a third or further destination in the case where speaking with a person of the second destination is also difficult. Furthermore, the terminal may be configured so as to originate a call to the first destination again.

In the case where the telephone communication terminal shown in FIG. 5 is a digital cordless telephone terminal or a digital cellular telephone terminal, a digital signal processor (DSP) is often used for speech coding and decoding in the baseband unit 304. Processing of a sound level measuring instrument 309, threshold generators 310 and 313, comparators 311 and 314, an analyzer 312, the ring back tone detector 316 and the busy tone detector 317 in the present invention can be easily implemented by computation processing of the DSP. By using a DSP having a margin in processing capability, therefore, the present invention can be implemented without increasing the amount of hardware.

In the case where the telephone communication terminal shown in FIG. 2 or 5 effects a hands-free function, the voice of the answering person is outputted via the loudspeaker of the caller's side and reaches the ears of the caller existing in the vicinity of the caller's terminal. Even if the caller does not carry the terminal, therefore, the caller can speak with the person who has answered. In the scene of nursing for an infant, a sick person or the like, application of the present invention brings about a great effect.

Concrete examples of application of the present invention will now be described.

Figure 6:
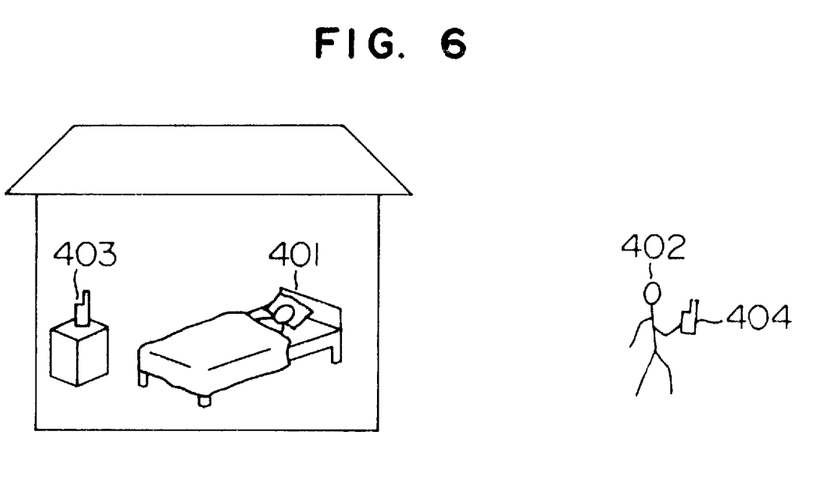
FIG. 6 shows an example of application of the present invention to a cellular terminal effecting a hands-free function.

FIG. 6 shows an example of application of a telephone communication terminal according to the present invention to a cellular terminal effecting a hands-free function. In the vicinity of a nursed person 401 in a house, a cellular terminal 403 effecting the function of the present invention is disposed.

A nursing person 402 always carries a conventional cellular terminal 404. In the case where the nursed person 401 wants to communicate with the nursing person 402, the nursed person 401 calls the name of the nursing person, for example. As a result, the cellular terminal 403 senses the voice of the nursed person 401 and automatically originates a call to a cellular terminal 404 having a telephone number registered beforehand to call the nursing person 402. Therefore, the nursing person 402 need not always stay close to the nursed person 401, but can effect nursing while performing different business such as outdoor shopping.

Figure 7:
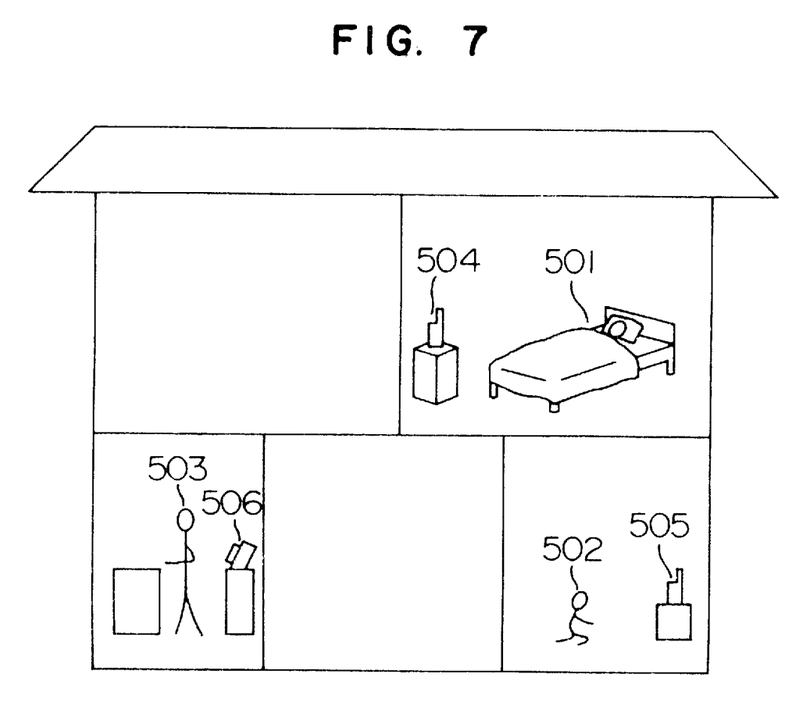
FIG. 7 shows an example of application of the present invention to a cordless terminal effecting a hands-free function.

FIG. 7 shows an example of application of a telephone communication terminal according to the present invention to a cordless terminal effecting a hands-free function. Near nursed persons 501 and 502 in a house, personal stations 504 and 505 of a cordless telephone effecting the function of the present invention are disposed, respectively. Near a nursing person 503 who is in a different room in the house, a base station 506 of the cordless telephone is disposed.

By utterance of a voice performed by the nursed person 501 or 502, the personal station 504 or 505 senses the voice of the nursed person 501 or 502 and automatically originates a call to the base station 506. Communication to the base station 506 is thus made possible. Therefore, the nursing person 503 need not be always near the nursed person 501 or 502, but can continue nursing while performing a work in the different room.

According to the present invention, there is provided means for monitoring the sound level and spectral shape or spectral distribution of a voice or the like inputted to a telephone transmitter of a telephone communication terminal, and responsive to detection of a sound volume having at least a fixed value and spectral information falling in a certain range, for automatically originating a call to a telephone number registered beforehand. In such application that manual call originating operation is difficult, therefore, automatic origination of a call to a registered destination responsive to a voice or the like becomes possible. Furthermore, in the case where the terminal is a digital mobile terminal, the present invention can be implemented without increasing the amount of hardware.

We claim:

1. A telephone communication terminal comprising:

means for measuring, at fixed time intervals, a sound level of a signal inputted to a telephone transmitter;

means for setting a preset threshold value for comparison with the sound level measured by said measuring means;

first comparator means for comparing a value measured by said measuring means with the preset threshold value;

analyzer means for analyzing an input signal, and extracting spectral information from said input signal at said fixed time intervals;

means for setting a preset lower limit threshold value and a preset upper limit threshold value for comparison with the spectral information;

second comparator means for comparing a value extracted by said analyzer means with the preset lower limit threshold value and the preset upper limit threshold value; and controller means for originating a call to a telephone number registered beforehand when an output of said first comparator means and an output of said second comparator means simultaneously indicate that said measured sound level is greater than said preset threshold value in said first comparator means and said extracted value is in a range between said preset lower limit threshold value and said preset upper limit threshold value in said second comparator means.

2. A telephone communication terminal according to claim 1, further comprising:

means for monitoring a received signal to determine whether one of a ring back tone and a busy tone is continuously sensed for at least a fixed time;

wherein said controller means disconnects speech and originates a call to another telephone number registered beforehand on the basis of an output of said monitoring means.

3. A telephone communication terminal according to claim 1, wherein said telephone communication terminal effects a hands-free function for outputting a received signal from a loudspeaker.

4. A telephone communication terminal according to claim 1, wherein the calling telephone communication terminal is one of a base station and a personal station of a cordless telephone set, and the called telephone communication terminal is one of a personal station and a base station of the calling telephone communication terminal.

5. A telephone communication terminal according to claim 2, wherein the calling telephone communication terminal is one of a base station and a personal station of a cordless telephone set, and the called telephone communication terminal is one of a personal station and a base station of the calling telephone communication terminal.

6. A telephone communication terminal comprising:

a measuring unit for measuring a sound level of a signal inputted to a telephone transmitter;

means for setting a preset threshold value for comparison with the sound level measured by said measuring unit;

a first comparator for comparing a value measured by said measuring unit with the preset threshold value;

an extractor unit for analyzing said input signal, and extracting spectral information from said input signal;

means for setting a preset lower limit threshold value and a preset upper limit threshold value for comparison with the information extracted by said extractor unit;

a second comparator for comparing a value extracted by said extractor unit with the preset lower limit threshold value and the preset upper limit threshold value;

a first controller for receiving results outputted from said first comparator and said second comparator, and for originating a call to a first telephone number registered in a destination number storage on the basis of the results outputted from said first comparator and said second comparator when, simultaneously, said measured sound level is greater than said threshold value in said first comparator and said extracted value is in a range between said lower limit threshold value and said upper limit threshold value in said second comparator;

a monitor unit for monitoring one of a ring back tone and a busy tone to determine whether the ring back tone or the busy tone is sensed continuously for at least a fixed time period; and a second controller, responsive to said ring back tone or busy tone sensed by said monitor unit continuously for at least a fixed time period after origination and ringing of the call to the first telephone number, for automatically effecting an on-hook operation, disconnecting a call assuming an off-hook state, thereafter reading out a second telephone number registered beforehand in a destination number storage, and newly originating a call to the second telephone number.

7. A communication method for a telephone communication terminal comprising:

a sound level measuring step for measuring a sound level of a signal inputted to a telephone transmitter when a telephone communication terminal is brought into an off-hook state in an automatic calling mode and an operation mode;

a step for setting a preset threshold value for comparison with the sound level measured in said sound level measuring step;

a first comparison step for comparing said measured sound level with the preset threshold value;

an analysis step for effecting analysis on said signal inputted to the telephone transmitter, and extracting spectral information from said signal;

a step for setting a preset lower limit threshold value and a preset upper limit threshold value for comparison with the information extracted in said extracting step;

a second comparison step for comparing a value extracted by said analysis step with the preset lower limit threshold value and the preset upper limit threshold value;

a step for receiving results of comparison at said first and second comparison steps and reading out desired telephone number information registered beforehand in a destination number storage when, simultaneously, said measured sound level is greater than said threshold value in said first comparison step and said extracted value is in a range between said lower limit threshold value and said upper limit threshold value in said second comparison step; and a step for originating a call to a telephone number of said desired telephone number information.

8. A communication method for a telephone communication terminal according to claim 7, further comprising the steps of:

monitoring a signal received by said communication terminal and thereby determining whether one of a ring back tone and a busy tone is sensed continuously for at least a fixed time period;

automatically effecting an on-hook operation and disconnecting a call assuming an off-hook state when said ring back tone or busy tone is sensed at said monitoring step continuously for at least a fixed time period; and originating a call to a different telephone number registered beforehand in a destination number storage after said disconnecting step.

9. A telephone communication terminal according to claim 1, wherein the analyzer means effects non-parametric analysis on the input signal and extracts short-term spectral information from the input signal at said fixed time intervals.

10. A telephone communication terminal according to claim 1, wherein the analyzer means effects parametric analysis on the input signal extracts spectral envelope information from the input signal at said fixed time intervals.

11. A telephone communication terminal according to claim 6, wherein the extractor unit effects non-parametric analysis on said input signal and extracts short-term spectral information from the input signal.

12. A telephone communication terminal according to claim 6, wherein the extractor unit effects parametric analysis on said input signal and extracts spectral envelope information from the input signal.

13. A communication method for a telephone communication terminal according to claim 7, wherein the analysis step effects non-parametric analysis on the signal inputted to the telephone transmitter and extracts short-term spectral information from the signal.

14. A communication method for a telephone communication terminal according to claim 7, wherein the analysis step effects parametric analysis on the signal inputted to the telephone transmitter and extracts spectral envelope information from the signal.

* * * * *